United States Patent
Yu et al.

(10) Patent No.: US 10,938,022 B2
(45) Date of Patent: Mar. 2, 2021

(54) MECHANICALLY FLEXIBLE MAGNESIUM-ION BATTERY ELECTRODES IN A POLYMER GEL PERCHLORATE ELECTROLYTE

(71) Applicants: Hongbin Yu, Chandler, AZ (US); Todd Houghton, Tempe, AZ (US)

(72) Inventors: Hongbin Yu, Chandler, AZ (US); Todd Houghton, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 28 days.

(21) Appl. No.: 16/427,639

(22) Filed: May 31, 2019

(65) Prior Publication Data

US 2019/0372097 A1    Dec. 5, 2019

Related U.S. Application Data

(60) Provisional application No. 62/679,574, filed on Jun. 1, 2018.

(51) Int. Cl.
*H01M 4/137* (2010.01)
*H01M 10/054* (2010.01)
(Continued)

(52) U.S. Cl.
CPC .......... *H01M 4/137* (2013.01); *H01M 4/602* (2013.01); *H01M 4/621* (2013.01); *H01M 4/626* (2013.01);
(Continued)

(58) Field of Classification Search
CPC .......... H01M 10/054; H01M 10/0565; H01M 2300/0082; H01M 2300/0085; H01M 4/134; H01M 4/136; H01M 4/137; H01M 4/38; H01M 4/5815; H01M 4/602; H01M 4/621; H01M 4/622; H01M 4/626; Y02E 60/10

See application file for complete search history.

(56) References Cited

U.S. PATENT DOCUMENTS 9,881,731 B2    1/2018 Yu et al.
10,139,295 B2   11/2018 Yu et al.
(Continued)

FOREIGN PATENT DOCUMENTS

WO  WO 2015073873  5/2015
WO  WO 2016126693  8/2016
WO  WO 2018208989  11/2018

OTHER PUBLICATIONS

Allart et al, "Model of Lithium Intercalation into Graphite by Potentiometric Analysis with Equilibrium and Entropy Change Curves of Graphite Electrode." Journal of the Electrochemical Society, 2018, 165(2):A380-A387.
(Continued)

*Primary Examiner* — Victoria H Lynch
(74) *Attorney, Agent, or Firm* — Fish & Richardson P.C.

(57) ABSTRACT

A magnesium-ion battery includes a solid, mechanically flexible polymer-based anode, a solid, mechanically flexible polymer-based cathode, and a polymer gel electrolyte in contact with the anode and the cathode. An electrode can include bismuth nanostructure powder and an electrolyte binder, or tungsten disulfide and an electrolyte binder.

19 Claims, 9 Drawing Sheets

(51) Int. Cl.
    H01M 10/0565    (2010.01)
    H01M 4/62       (2006.01)
    H01M 4/60       (2006.01)
(52) U.S. Cl.
    CPC ..... H01M 10/054 (2013.01); H01M 10/0565 (2013.01); H01M 2300/0085 (2013.01)

(56) References Cited

U.S. PATENT DOCUMENTS

| | | | |
|---|---|---|---|
| 10,390,698 B2 | 8/2019 | Yu et al. | |
| 2013/0108919 A1* | 5/2013 | Matsui | C22C 12/00 429/188 |
| 2013/0115521 A1* | 5/2013 | Doe | H01M 10/056 429/329 |
| 2014/0152410 A1 | 6/2014 | Yu et al. | |
| 2014/0302354 A1* | 10/2014 | Shao | H01M 4/466 429/50 |
| 2017/0323990 A1 | 11/2017 | Yu et al. | |

OTHER PUBLICATIONS

Canepa et al, "Odyssey of Multivalent Cathode Materials: Open Questions and Future Challenges," Chem. Rev., 2017, 117:4287-4341.

Hsing Po Kang et al, "Potential Environmental and Human Health Impacts of Rechargeable Lithium Batteries in Electronic Waste," Environ. Sci. Technol., Apr. 2013, 47:5495-5503.

Long et al, "Polymer electrolytes for lithium polymer batteries," J. Mater. Chem. A, vol. 4, pp. 10038-10069, Mar. 2016.

Nitta et al, "Li-ion battery materials: present and future," Materials Today, Jun. 2015, 18(5):252-264.

Pandey et al, "Magnesium ion-conducting gel polymer electrolytes dispersed with fumed silica for rechargeable magnesium battery application," J. Solid State Electrochem, Nov. 2010, 15:2253-2264.

Pisoni et al, "Anisotropic transport properties of tungsten disulfide," Scripta Materialia, Dec. 2015, 114:48-50.

Rong et al, "Fast Mg2+ diffusion in Mo3(PO4)3O for Mg batteries," Chem. Commun., Jun. 2017, 53:7998-8001.

Shao et al, "Highly Reversible Mg Insertion in Nanostructured Bi for Mg Ion Batteries," Nano. Lett., Nov. 2013, 14:255-260.

Tafur Guisao et al, "Interaction between Zn2+ cations and n-methyl-2-pyrrolidone in ionic liquid-based Gel Polymer Electrolytes for Zn batteries," Electrochimica Acta, Jul. 2015, 176:1447-1453.

U.S. Appl. No. 16/612,069, Jiang, et al., filed Nov. 9, 2019.

Yang et al, "A Room-Temperature Route to Bismuth Nanotube Arrays," Eur. J. Inorg. Chem., Oct. 2003, 2003:3699-3702.

\* cited by examiner ial impact 25
compared to lithium. However, despite these potential
advantages, technical challenges remain which prevent com-
mercialization of the technology.

MECHANICALLY FLEXIBLE MAGNESIUM-ION BATTERY ELECTRODES IN A POLYMER GEL PERCHLORATE ELECTROLYTE

CROSS-REFERENCE TO RELATED APPLICATION

This application claims the benefit of U.S. Application No. 62/679,574 filed on Jun. 1, 2018, which is incorporated by reference herein in its entirety.

TECHNICAL FIELD

This invention relates to mechanically flexible magnesium-ion battery electrodes in a polymer gel perchlorate electrolyte.

BACKGROUND

Magnesium ion batteries present a potential alterative to lithium-ion cells in emerging market sectors, such as wearable electronics, grid-scale energy storage, and electric vehicles due to a combination of high volumetric capacity, material cost, and possibly lower environmental impact compared to lithium. However, despite these potential advantages, technical challenges remain which prevent commercialization of the technology.

SUMMARY

In a first general aspect, a magnesium-ion battery includes a solid, mechanically flexible polymer-based anode, a solid, mechanically flexible polymer-based cathode, and a polymer gel electrolyte in contact with the anode and the cathode.

Implementations of the first general aspect may include one or more of the following features.

The polymer-based anode may include bismuth nanostructure powder and an electrolyte binder. The bismuth nanostructure powder may include bismuth nanotubes. The electrolyte binder may include polyvinylidene fluoride-co-hexafluoropropylene and magnesium perchlorate. The electrolyte binder may include ethylene carbonate and propylene carbonate. The electrolyte binder may include fumed silica. The polymer-based anode may include stainless steel powder. In some cases, the polymer-based cathode includes tungsten disulfide and an electrolyte binder. The polymer-based cathode may further include stainless steel powder. In certain cases, the polymer gel electrolyte includes polyvinylidene fluoride-co-hexafluoropropylene and magnesium perchlorate. The polymer gel electrolyte may further include ethylene carbonate and propylene carbonate. The polymer gel electrolyte may further include fumed silica.

In a second general aspect, an electrode includes bismuth nanostructure powder and an electrolyte binder.

Implementations of the second general aspect may include one or more of the following features.

The bismuth nanostructure powder may include bismuth nanotubes. The electrolyte binder may include polyvinylidene fluoride-co-hexafluoropropylene and magnesium perchlorate. The electrode may further include stainless steel powder.

In a third general aspect, an electrode includes tungsten disulfide and an electrolyte binder.

Implementations of the third general aspect may include one or more of the following features.

The electrolyte binder may include polyvinylidene fluoride-co-hexafluoropropylene and magnesium perchlorate. The electrolyte binder may further include ethylene carbonate and propylene carbonate. The electrode may include stainless steel powder.

DETAILED DESCRIPTION

Figure 1A:
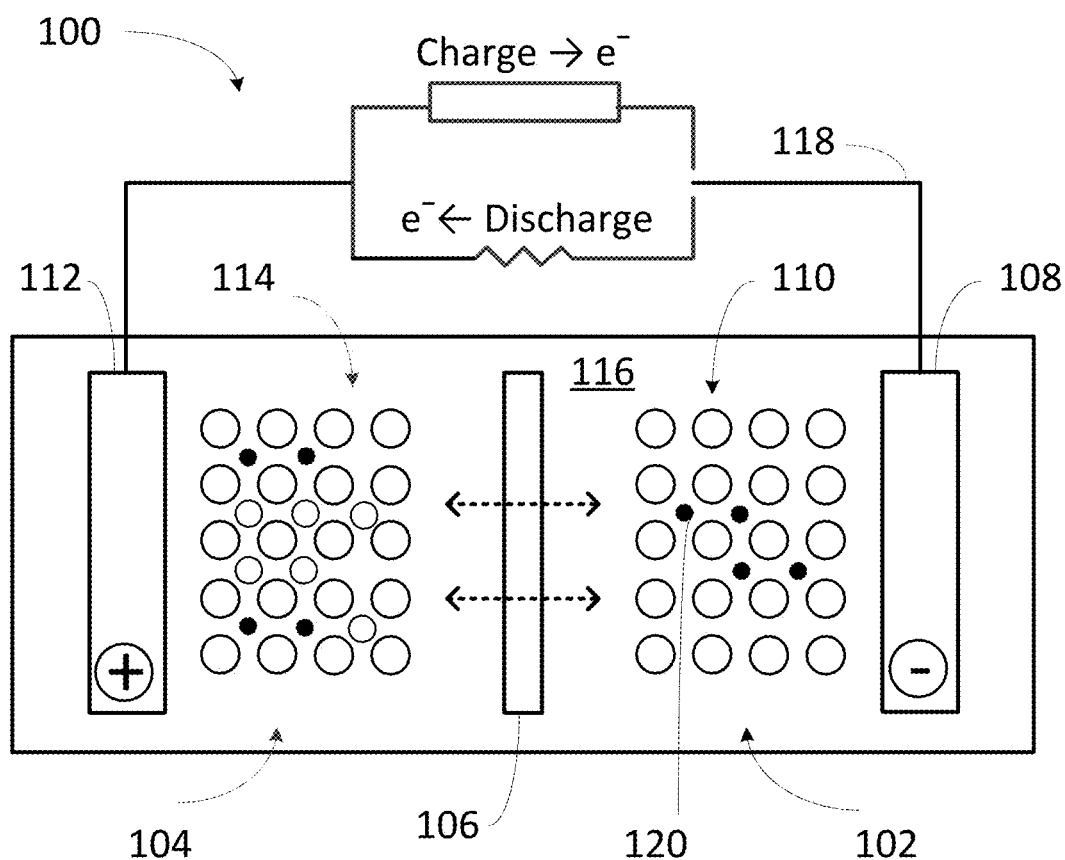
FIG. 1A depicts a magnesium-ion battery (MIB).
Figure 1B:
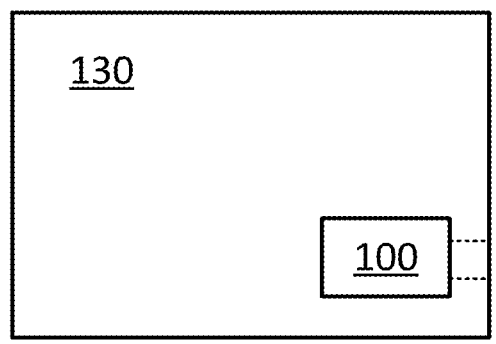
FIG. 1B depicts a device including a MIB.

FIG. 1A depicts magnesium-ion battery (MIB) 100 having anode 102 and cathode 104. Anode 102 and cathode 104 are separated by separator 106. Anode 102 includes anode collector 108 and anode material 110 in contact with the anode collector. Cathode 104 includes cathode collector 112 and cathode material 114 in contact with the cathode collector. Electrolyte 116 is in contact with anode material 110 and cathode material 114. Anode collector 108 and cathode collector 112 are electrically coupled via closed external circuit 118. Anode material 110 and cathode material 114 are materials into which, and from which, magnesium ions 120 can migrate. During insertion (or intercalation) magnesium ions move into the electrode (anode or cathode) material. During extraction (or deintercalation), the reverse process, magnesium ions move out of the electrode (anode or cathode) material. When a MIB is discharging, magnesium ions are extracted from the anode material and inserted into the cathode material. When the cell is charging, magnesium ions are extracted from the cathode material and inserted into the anode material. The arrows in FIG. 1A depict movement of magnesium ions through separator 106 during charging and discharging. FIG. 1B depicts device 130 including MIB 100. Device 130 may be, for example, an electric vehicle, an electronic device (e.g., a portable electronic device such as a cellular telephone, a tablet or laptop computer, etc.), or the like.

Mechanically flexible polymer-based anodes, cathodes, and electrolyte, intended for use in a rechargeable magnesium ion battery cell were fabricated and characterized using cyclic voltammetry (CV), linear sweep voltammetry (LSV), and impedance spectroscopy (IS). The ionic conductivity ($\sigma$) of the fabricated polymer gel electrolyte (PGE) made of PVDF-HFP (polyvinylidene fluoride-co-hexafluoropropylene), ethylene carbonate (EC), propylene carbonate (PC), fumed silica, and magnesium perchlorate, was equal to 4.39 mS/cm. This value of $\sigma$ is similar in magnitude to polymer electrolytes containing lithium or zinc ions.

Using LSV it was determined that an unintended redox reaction takes place between dissolved magnesium perchlorate in the PGE and the stainless steel (SS) foil electrodes used in all CV and LSV test runs. Electrical current generated by this reaction was significant above ±1.5V. As a result, electrical current generated by this reaction was considered during subsequent cyclic voltammetry scans of the cathode|PGE and anode|PGE interfaces.

Bismuth nanostructures were fabricated using a solution-based method, in which bismuth chloride ($BiCl_3$) and tin chloride ($SnCl_2$) are reduced in an aqueous environment to yield bismuth nanotubes. After fabrication, Bi-nanostructure powder was mixed with stainless steel powder, liquid PGE, and deposited on a stainless steel foil current collector, forming a solid, polymer-based Mg battery anode. Redox reactions at the Bi-nanostructure anode and PGE interface were characterized using cyclic voltammetry. No significant redox reaction involving $Mg^{2+}$ ions and the Bi-nanostructure anode was found.

Solid, polymer-based tungsten disulfide cathodes were fabricated by mixing $WS_2$ powder, stainless steel powder, and liquid PGE together. The resulting mixture was deposited on stainless steel foil, forming a cathode. Redox reactions at the PGE|$WS_2$ interface were studied using cyclic voltammetry. It was found that a partially reversible redox reaction takes place at the interface, possibly due to the insertion of Mg ions between atomic layers of $WS_2$.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to be limiting in scope. Some of these synthetic examples have been performed. Others are based on an understanding of related synthetic procedures and are predictive in nature. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Various methods for the preparation method of the compounds described herein are recited in the examples. These methods are provided to illustrate various methods of preparation, but are not intended to limit any of the methods recited herein. Accordingly, one of skill in the art in possession of this disclosure could readily modify a recited method or utilize a different method to prepare one or more of the compounds described herein. The following aspects are only exemplary and are not intended to be limiting in scope. Temperatures, catalysts, concentrations, reactant compositions, and other process conditions can vary, and one of skill in the art, in possession of this disclosure, could readily select appropriate reactants and conditions for a desired complex.

I. Experimental Methods

A. Materials

Anhydrous Propylene Carbonate (CAS 108-32-7), Ethylene Carbonate 98% (CAS 96-49-1), PVDF-HFP (Polyvinylidene fluoride-co-hexafluoropropylene) (CAS 9011-17-0) pellets, 0.007 µm Fumed Silica Powder (CAS 112945-52-5), Bismuth(III) Chloride (CAS 7787-60-2), Tin(II) Chloride Dihydrate (CAS 10025-69-1), 2 µm Tungsten(IV) Sulfide Powder (CAS 12138-09-9), and Sodium Hydroxide Pellets (CAS 1310-73-2) were purchased from Sigma Aldrich. Anhydrous Magnesium Perchlorate (CAS 10034-81-8) was purchased from Alfa Aesar. 50.8 µm thick type 304 stainless steel foil was purchased from Grainger Inc. and 10 µm type 304 stainless steel powder was purchased from US Research Nanomaterials Inc.

B. Preparation of $Mg^{2+}$ Polymer Gel Electrolyte (PGE)

Polymer gel electrolytes (PGE) were prepared. Magnesium perchlorate ($Mg(ClO_4)_2$) and fumed silica were first placed in a drying oven heated to 100° C. for one hour before use. A 1.0M $Mg(ClO_4)_2$ liquid electrolyte solution was then prepared by dissolving oven dried magnesium perchlorate in a mixture of ethylene carbonate (EC) and propylene carbonate (PC) with a 1:1 volume to volume ratio in a beaker at 40° C. via magnetic stirring.

In a separate beaker, PVDF-HFP polymer pellets equaling 20% of the liquid electrolyte solution weight were dissolved in acetone at 40° C. via magnetic stirring. The dissolved polymer was added to the beaker containing the 1.0M $Mg(ClO_4)_2$ EC/PC solution under constant stirring at 40° C. Dried fumed silica powder equaling 1.3% of the total $Mg(ClO_4)_2$+EC/PC+PVDF-HPF reagent weight was then added to the solution.

The solution beaker was covered by a piece of PARAFILM and stirred at 35° C. for 10 hours. Resulting solutions were viscous and off-white in appearance. Completed batches were poured into glass petri dishes on a hotplate with a surface temperature of 40° C. and left to dry in air for several hours to evaporate the remaining acetone. Resulting polymer gel electrolytes (PGE) were freestanding, flexible, and mechanically robust enough to handle with gloves. Thickness was approximately 0.8 mm depending on the batch.

C. Preparation of Bismuth Nanotube Anode

Bismuth nanotubes were synthesized via reduction of bismuth (III) chloride by tin(II) chloride dihydrate in a pH adjusted aqueous environment. In a typical Bi nanotube synthesis, 2 mmol of bismuth(III) chloride ($BiCl_3$) and 8 mmol of sodium hydroxide (NaOH) were added to 50 mL of deionized (DI) water in a beaker and stirred magnetically. In a second beaker, 3 mmol of tin(II) chloride dihydrate ($SnCl_2 \cdot 2H_2O$) and 12 mmol of NaOH were added to 50 mL of water using magnetic stirring. The contents of the second beaker was slowly added to the first beaker under magnetic stirring, resulting in a dark blue solution which was left to stir for 10 hours at room temperature.

Following a 10 hour stirring process, the solution was removed from its stir pad and allowed to sit undisturbed for 2 hours while the bismuth nanotube agglomerates precipitated. The remaining solution was then decanted and replaced with a 1M solution of HCl for several minutes to remove any unreacted material. Next, the nanotubes were washed several times in DI water to remove any remaining HCL. Finally, the Bi nanotube (BiNT) sediment was dried in a vacuum oven at 60° C. for 4 hours, resulting in a black powder.

Anodes were prepared by dispensing stainless steel (SS) powder into a beaker containing dried Bi nanotube powder (60% Bi Nanotubes, 40% SS by weight). Polymer Gel Electrolyte solution (PGE) equaling 50% of the BiNT+SS weight was mixed into the powder with a small stainless steel spatula. Acetone was then dispensed into the beaker and stirred, forming a slurry. The BiNT+SS+PGE slurry was deposited onto 2 cm×2 cm pieces of stainless-steel foil using a laboratory pipette and dried at room temperature, forming a layer of BiNTs+SS+PGE binder approximately 1 mm thick.

D. Preparation of Tungsten Disulfide Cathode

Tungsten disulfide ($WS_2$) cathodes were prepared by dispensing $WS_2$ and stainless steel (SS) powders into a clean beaker (60% $WS_2$ and 40% SS by weight). Polymer Gel Electrolyte solution (PGE) equaling 50% of the $WS_2$+SS powder weight was added to the beaker and mixed into the $WS_2$+SS powder with a small stainless steel spatula. Acetone was then dispensed into the beaker and stirred, forming a slurry. The $WS_2$+SS+PGE slurry was deposited onto 2 cm×2 cm pieces of stainless-steel foil using a laboratory pipette and dried at room temperature, forming a layer of $WS_2$+SS+PGE binder approximately 1 mm thick.

E. Impedance Spectroscopy of Polymer Gel Electrolyte

A calibrated Metrohm Autolab PGStat 30 operating in two-terminal mode was used to perform impedance spectroscopy of Polymer Gel Electrolyte (PGE) samples sandwiched between two 2 cm×2 cm stainless steel foil electrodes. PGE samples were cut slightly larger than 2 cm×2 cm to ensure no electrical contact was present between the upper and lower electrodes. A small PTFE weight was used to gently press down on the PGE-electrode sandwich, ensuring good mechanical contact with minimal deformation.

F. Electrochemical Characterization of Mg-Free Polymer Gel Electrolyte

To account for and characterize any unwanted side reactions between the stainless steel electrodes and inactive electrolyte materials (EC, PG, and silica), a Mg-free electrolyte was prepared as described previously, however no magnesium perchlorate was added to the EC/PC mixture.

CV measurements of the Mg-free PGE were performed using the same Metrohm Autolab PGStat 30 described previously. Mg-free PGE samples slightly larger than 2 cm×2 cm were sandwiched between two 2 cm×2 cm stainless steel electrodes. A small PTFE weight was used to press down on the PGE-electrode sandwich, ensuring good electrical contact.

G. Electrochemical Characterization of the Stainless Steel and Polymer Gel Electrolyte Interface LSV measurements of the SS|PGE interface were performed using the same Metrohm Autolab PGStat 30 described previously. Samples consisted of stainless steel foil. The PGE layer was cut slightly larger than 2 cm×2 cm to ensure no electrical contact was present between the upper and lower electrode. A small PTFE weight was used to gently press on the SS|PGE|SS, sandwich, ensuring good mechanical contact with minimal deformation.

The purpose of these measurements was to determine the magnitude of any unwanted side reactions between stainless steel and the PGE at a given electrochemical potential. Unwanted reactions are often irreversible and begin to occur when the electrochemical potential across an interface exceeds a threshold. Ideally, all desirable (i.e., reversible) reactions between the anode, cathode, and electrolyte occur at potentials smaller than the threshold.

H. Electrochemical Characterisation of Anode Electrolyte and Cathode Electrolyte Interfaces CV measurements of the bismuth nanotube anodes or tungsten disulfide cathodes was performed using the same Metrohm Autolab PGStat 30 described previously. Samples consisted of polymer gel electrolyte sandwiched between a 2 cm×2 cm stainless steel foil electrode and a 2 cm×2 cm bismuth nanotube anode. Alternatively, the bismuth nanotube anode could be replaced with a tungsten disulfide cathode of the same physical dimensions.

The PGE layer was cut slightly larger than 2 cm×2 cm to ensure no electrical contact was present between the SS electrode and the anode or cathode. A small PTFE weight was used to gently press on the sample, ensuring good mechanical contact with minimal deformation. All CV measurement runs were carried out with fresh samples electrodes to minimize cross contamination.

II. Results and Discussion

A. Impedance Spectroscopy and Ionic Conductivity of the Polymer Gel Electrolyte

In battery chemistry, an electrolyte refers to any material in which ions can move freely, but electrons cannot. Because ions are primary charge carrier, performance is heavily dependent on an ion's ability to move unimpeded within the confines of the electrolyte. At the macro scale, ionic conductivity ($\sigma$), which represents an electrolyte's ability to conduct electrical current using ions, serves as an effective metric for comparing ion transport in electrolyte materials and solutions. The equation for ionic conductivity ($\sigma$) is as follows:

$$\sigma = t/(R_b * A) \quad (1)$$

where $\sigma$ is the ionic conductivity, t is the PGE sample thickness, $R_b$ is the bulk resistance of the PGE, and A is the sample area.

Determination of $R_b$ requires the use of alternating current (AC) impedance spectroscopy. An AC signal is significant for electrolytes, as ions have a tendency to 'pile up' near one of the electrolyte/electrode interfaces when direct current (DC) is used. This DC 'pile-up' effect results in artificially high $R_b$ values, as the ion gradient around the electrode counteracts the externally applied potential. An AC signal solves this issue by preventing a large ion gradient from forming near the electrodes. However, the use of an AC signal makes the determination of $R_b$ more difficult, as any impedance measurement of the system will have both real and complex components.

Figure 2A:
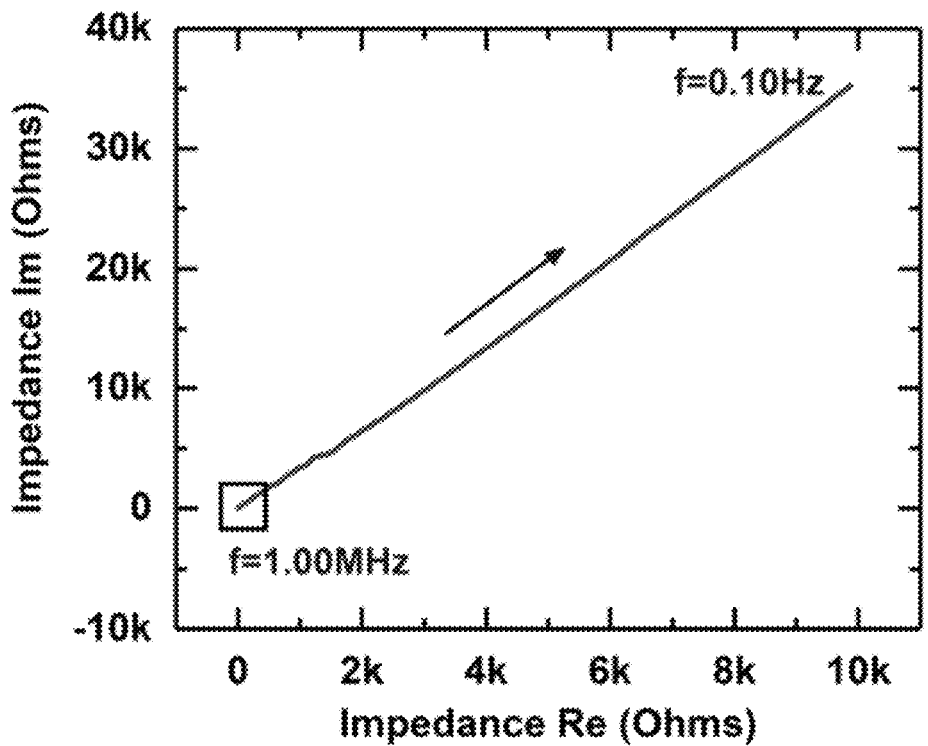
FIG. 2A shows an impedance spectroscopy diagram of a typical polymer gel electrolyte (PGE) sample sandwiched between two stainless steel electrodes at 25° C.

Impedance values of a PGE sample were obtained at frequencies ranging from 1 MHz to 100 mHz by placing a sinusoidal voltage signal with an amplitude of 0.1 Vpp across the electrolyte. Next, the real and complex impedance components measured at each frequency step were plotted as x,y pairs, forming a Cole-Cole plot as shown in FIG. 2A. Sample impedance data was recorded over a frequency range of 1 MHz to 100 mHz with an amplitude of 0.1 Vpp. The box at the lower end-point of the impedance curve highlights the high frequency, low impedance region. The impedance test frequency decreases in the direction of the arrow. On such a plot, the bulk resistance ($R_b$) can be found at points where the imaginary component of the impedance equals zero. Often, the exact point at which this occurs falls between two measurements, one below the x-axis and one above. In such cases, a line is dawn between the two points and the intersection of the line with the x-axis is called $R_b$.

Figure 2B:
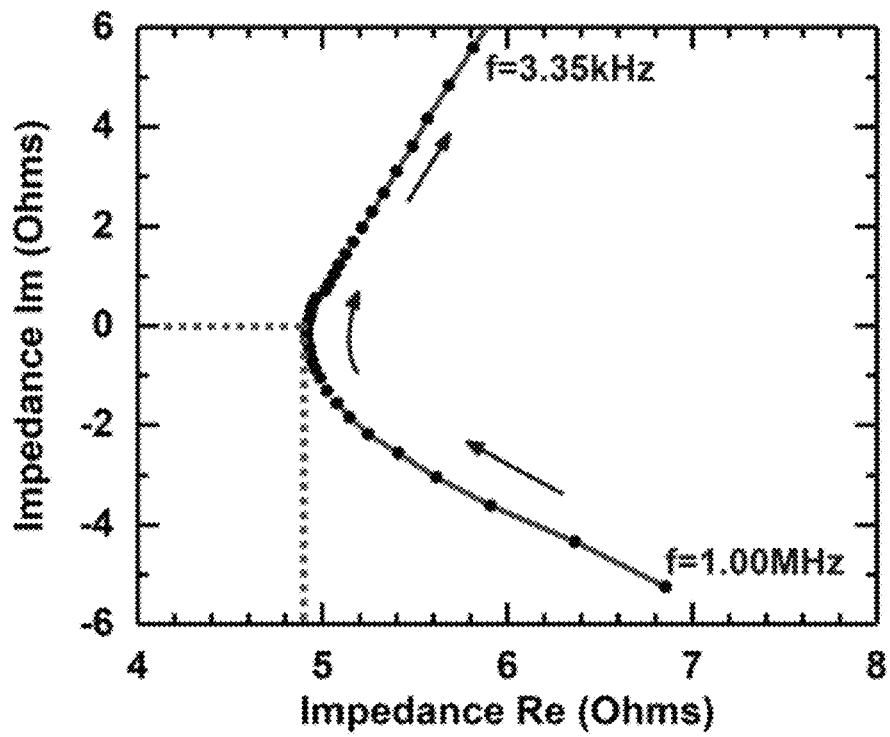
FIG. 2B shows a close-up view of the impedance spectroscopy data in the high frequency, low impedance region shown in FIG. 2A.

FIG. 2B, an enlargement of the low-impedance, high frequency region, designated by the box in FIG. 2A, reveals a single x-intercept point at approximately 4.90Ω, highlighted by the intersection of the dashed lines. At this point, the impedance measurement contains no imaginary component, meaning that the intercept x-value is equal to the bulk resistance ($R_b$) of the PGE sample. Inserting $R_b$ into equation (1) with A=4 cm$^2$ and t=0.086 cm, the ionic conductivity is equal to 4.39 mS/cm. The impedance test frequency decreases in the direction of the arrows.

B. Linear Sweep Voltammetry Measurement of the Stainless Steel Electrolyte Interface Anodes and cathodes found in contemporary battery cells make extensive use of oxidation-reduction (redox) reactions. Reactions of this type involve the direct transfer of electrons from one material to another at the interface of the two materials. For example, a lithium metal electrode immersed in lithium salt electrolyte solution can exchange electrons with Li$^+$ ions near the surface of the lithium electrode.

One aspect of redox reactions is that they can be initiated, halted, or reversed by applying an external voltage across the electrolyte-electrode interface. If a lithium metal electrode is placed at a negative potential relative to the surrounding electrolyte solution, Li$^+$ ions in the solution will be electrostatically attracted to the negatively charged lithium metal surface. At the surface, Li$^+$ ions accept electrons from the Li electrode and bond to the electrode, forming a new layer of lithium. If a lithium metal electrode is placed at a positive voltage relative to the electrolyte solution, metal atoms at the electrode surface give up an electron and detach from surface, becoming Li$^+$ ions that float freely though the electrolyte.

LSV is a quantitative method used to determine the voltage required to initiate a redox reaction between electrolyte and an electrode material. In LSV, a positive or negative voltage, which increases linearly with time, is applied between two electrodes until a given value is reached. An electrolyte sample is placed between the two electrodes and the electrical current passing from one electrode to the other is recorded with respect to the applied voltage. Because electrolytes are insulators that severely impede the flow of electrons from one electrode to the other, current can only be generated though redox reactions occurring at the electrode|electrolyte interfaces. Current-voltage (IV) plots can therefore be used to find the voltages required to initiate redox reactions. Additionally, reaction currents of different interfaces can be compared if the voltage scan rate is constant between samples.

Mg-ion polymer gel electrolyte samples were studied using LSV. In a typical experiment, a PGE sample was placed between two stainless steel electrodes. Voltage was then applied across the electrodes at a sweep rate of 0.01 V/s. The voltage was swept from 0V to 2.0V ten times consecutively to determine the effect of multiple sweep cycles.

Figure 3A:
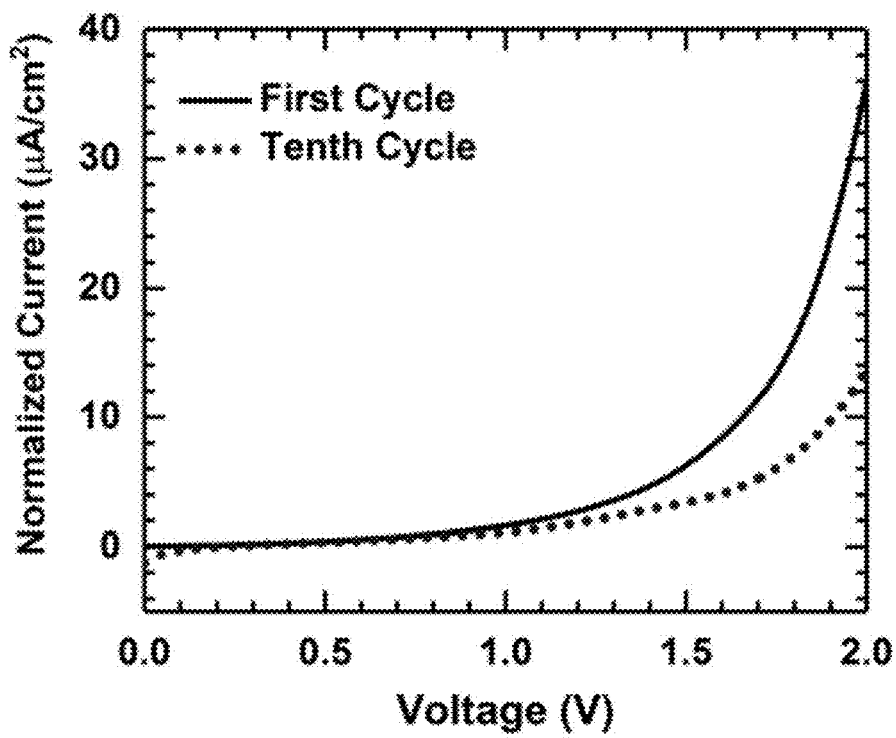
FIG. 3A shows a linear sweep voltammetry (LSV) plot of the PGE-stainless steel electrode interface at 25° C. and a voltage sweep rate of 0.01V/s, showing an unintended redox reaction taking place above 1.5V at both the first sweep cycle and tenth sweep cycle.

IV curves obtained from LSV measurements show a marked increase in reaction current above 1.5V, as shown in FIG. 3A. The reaction current climbs to 46.0 μA/cm$^2$ during the first cycle, but decreases to 13.7 μA/cm$^2$ by the tenth cycle. An increase in reaction current above 1.5V strongly implies the existence of a redox reaction between the stainless steel and the PGE. As a result, the magnitude to this reaction current is a consideration when evaluating the cyclic voltammetry plots of WS$_2$ cathodes and BiNT anodes.

C. Electrochemical Characterization of Perchlorate-Free Polymer Gel Electrolyte

To determine which electrolyte component undergoes a redox reaction with stainless steel, a PGE batch devoid of magnesium perchlorate (Mg(ClO$_4$)$_2$) was prepared. Electrochemical characterization of this PGE was carried out using CV. Cyclic Voltammetry measurements are similar to LSV, however the voltage sweep range and scanning behavior are different.

Figure 3B:
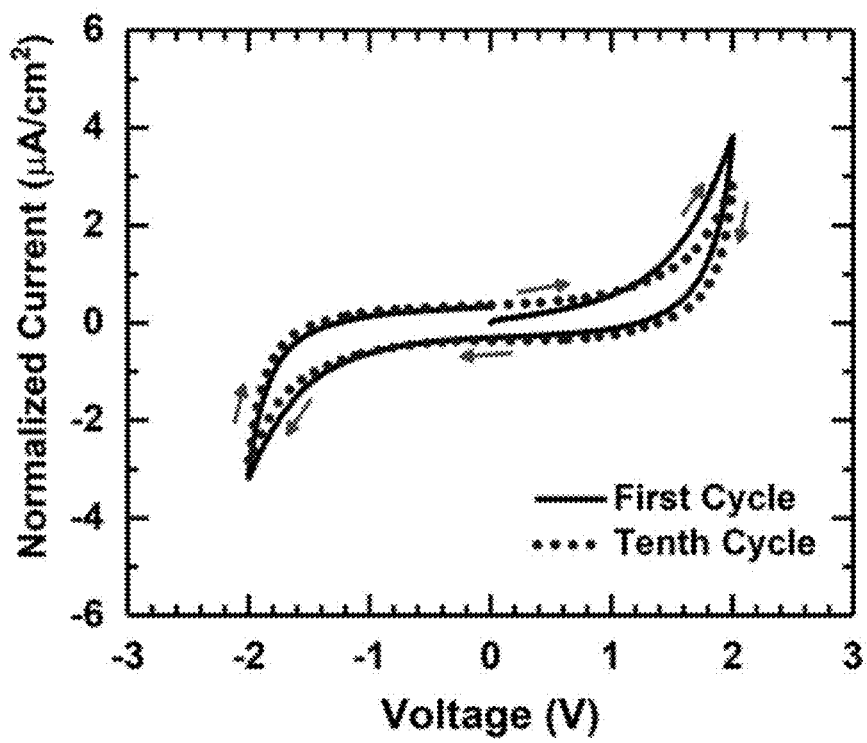
FIG. 3B shows a cyclic voltammetry (CV) plot of a PGE containing no magnesium perchlorate sandwiched between two stainless steel electrodes at 25° C. and a voltage sweep rate of ±0.01V/s.

For a general-purpose CV measurement, voltage between two electrodes is swept in both the negative and positive directions, in four distinct steps: (1) voltage is increased linearly from 0 V to the positive setpoint, (2) voltage linearly decreases from positive setpoint to 0 V, (3) voltage is linearly increased in the negative direction until the negative setpoint, (4) voltage is decreased linearly from the negative setpoint back to 0V. Unlike LSV, cyclic voltammetry can show voltage values required to initiate a redox reaction in both the forward and reverse directions. Additionally, currents from both reaction directions can be analyzed. PGE samples devoid of magnesium perchlorate were placed between two stainless steel electrodes, voltage between the electrodes was swept at ±0.01V with voltage endpoints of ±2.0V, resulting in a CV plot shown in FIG. 3B. The plot shows a maximum reaction current of 3.9 μA/cm$^2$ at 2.0V and −3.2 μA/cm$^2$ at −2.0V during the first cycle. By the tenth cycle, both reaction currents had dropped to ±2.9 μA/cm$^2$ at ±2.0V, possibly due to a decrease in the number of available reaction sites on the SS electrode surfaces due to irreversible reactions. Notably, the maximum reaction current at the ±2.0V peaks is significantly smaller than PGE samples containing magnesium perchlorate, such as the sample in FIG. 3A.

From this data, it appears that reaction currents from PGE samples free of magnesium perchlorate are smaller when compared to PGE samples containing perchlorate. This discrepancy is especially noticeable during the first positive voltage sweep, where the maximum reaction current in perchlorate-free PGEs is only equal to 8.5% of the maximum reaction current generated by PGEs containing perchlorate.

By the tenth positive voltage cycle, the reaction current of PGE samples containing perchlorate had dropped to 13.5 μA/cm$^2$, while the reaction current of perchlorate-free PGEs was equal to 2.9 μA/cm$^2$, or 21.5% of the current generated by perchlorate-containing PGEs. Given the large discrepancy in reaction current between perchlorate-free and standard PGE sample, it is likely that Mg(ClO$_4$)$_2$ contributes significantly to spurious redox reactions at the PGE|SS interface.

D. Cyclic Voltammetry Measurement of Cathode Electrolyte Interface

Figure 4:
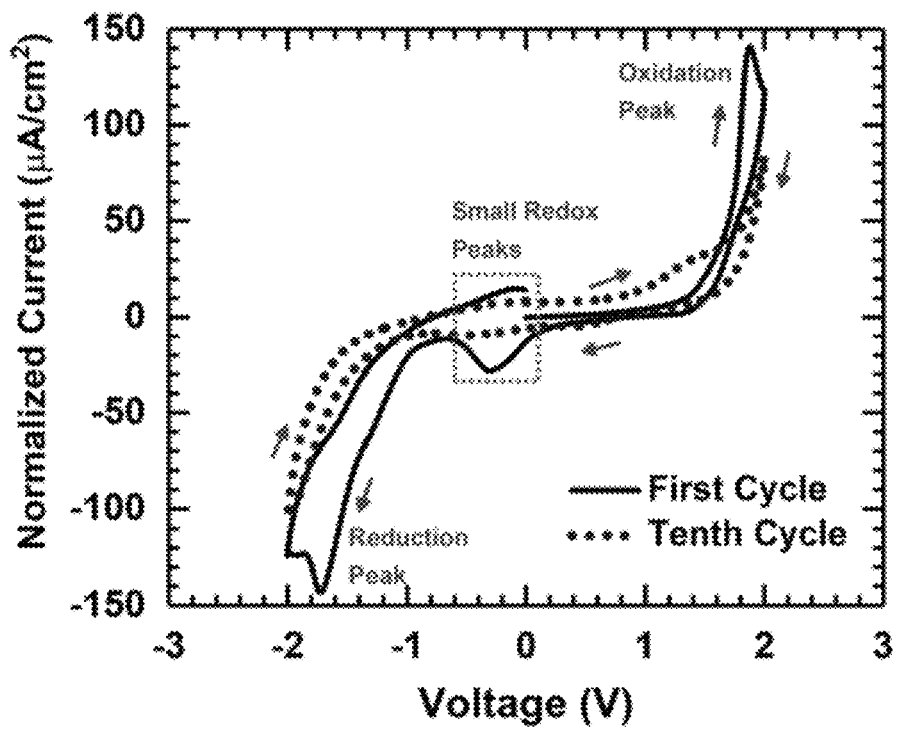
FIG. 4 shows a CV plot of the tungsten disulfide ($WS_2$) cathode-PGE interface at 25° C. and a voltage sweep rate of ±0.01V.

CV measurements of a Tungsten disulfide (WS$_2$) cathode were performed by sandwiching a PGE layer between the cathode and a SS electrode. Voltage between a SS electrode located underneath the WS$_2$ cathode material and the SS electrode located on top of the PGE was swept at a rate of ±0.01V with voltage endpoints of ±2.0V. The voltage was cycled ten times to assess multi-cycle stability, generating the CV plot shown in FIG. 4. Arrows indicate the voltage sweep direction. Two large oxidation and reduction peaks were observed at 1.83V and −1.71V, respectively, during the first cycle, but exhibited current fade after ten cycles, indicating the presence of a reversible or semi-reversible redox reaction. Such a reaction is possibly due to the insertion or removal of Mg ions from the WS$_2$ cathode, as WS$_2$ has a layered, planar atomic structure which could support Mg-ion intercalation. Smaller reaction peaks were also observed at −0.29V and 0.10V.

The resulting CV plot is characterized by two large reaction current peaks. During the first cycle, the oxidation peak is located at 1.83V with a reaction current of 143 $\mu A/cm^2$ while the reduction peak is located at −1.71V with a reaction current of −145 $\mu A/cm^2$. Both peaks have similar reaction voltage and current values, but opposite magnitudes, a feature frequently observed in previous CV measurements of PGEs in contact with two electrodes made of the same material. However, during this CV run, the PGE is in contact with a stainless steel upper electrode, and tungsten a disulfide lower electrode. Additionally, the peaks occur below ±2.0V and possess much higher current values than the spurious redox reactions taking place between stainless steel and the PGE.

One possible explanation for these peak features is that a reversible or semi-reversible reaction takes place at the PGE|WS$_2$ cathode interface. Tungsten disulfide has a layered, planar, atomic structure. Each layer is composed of tungsten atoms bonded to sulfur atoms with significant amounts of free space located between each layer. Such an atomic structure is similar to graphite, which is known to undergo a voltage-mediated redox reaction with Li$^+$ ions from a surrounding electrolyte. During the reaction, Li$^+$ ions are reduced and inserted in-between atomic graphite layers. A similar reaction could be taking place between the Mg$^{2+}$ ions in the PGE and the WS$_2$ cathode.

Alternatively, the presence of micro-scale stainless steel powder particles used to reduce the electrical resistance of the WS$_2$ cathode may be reacting with the PGE binder present in the cathode, and at the PGE interface. However, it should be noted that CV data from the Anode|PGE interface suggests that the presence of stainless steel powder is unlikely to be a significant source of additional reaction current.

After ten CV cycles, both the oxidation and reduction peaks have shifted to 2.0V and −2.0V, respectively. In addition to a shift, both peaks exhibit some degree current fade, with an oxidation peak of 81 $\mu A/cm^2$ and a reduction peak of −102 $\mu A/cm^2$. These observations suggest that at least some of the reactions between the WS$_2$ electrode and the PGE are not fully reversible. LSV measurements show that current contributed by reactions between SS and the PGE fades over ten cycles.

During the first CV cycle, two small reaction peaks emerge, a reduction peak located at −0.29V with a value of −32 $\mu A/cm^2$ and an oxidation peak located at −0.10V with a value of 17 $\mu A/cm^2$. Both peaks occur at far smaller voltages than any spurious redox reactions between SS and PGE, suggesting a new redox reaction.

E. Cyclic Voltammetry Measurement of the Anode Electrolyte Interface

Figure 5:
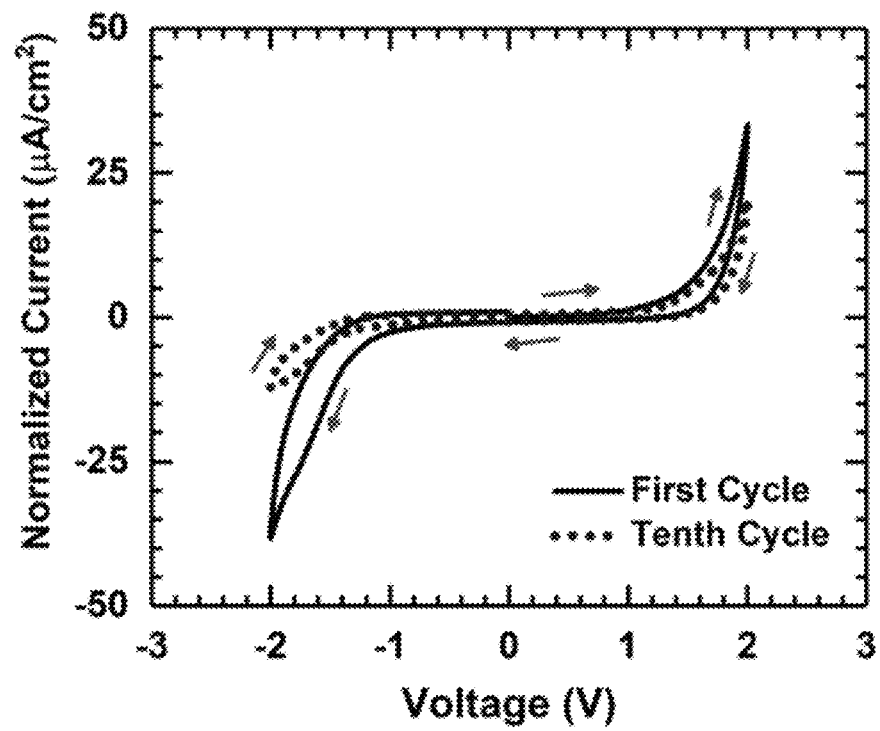
FIG. 5 shows a CV plot of the bismuth nanotube-PGE interface at 25° C. and a sweep rate of 0.01V/s.

CV measurements of a Bismuth nanotube (BiNT) anode were performed by sandwiching a PGE layer between the anode and a SS electrode. Voltage between a SS electrode located underneath the BiNT+SS+PGE binder material and the SS electrode located on top of the PGE layer was swept at a rate of ±0.01V with voltage endpoints of ±2.0V. The voltage was cycled ten times to assess multi-cycle stability, generating the CV plot shown in FIG. 5. Arrows indicate the voltage sweep direction. The resulting CV plot is characterized by two large current peaks. In the initial CV cycle, the first peak is located at 2.0V and with a reaction current of 34 $\mu A/cm^2$. A second peak is located at −2.0V with a current value of −38 $\mu A/cm^2$. After ten cycles, significant capacity fade at both the −2.0V and 2.0V peak is observed with reaction currents of −12 $\mu A/cm^2$ and 19 $\mu A/cm^2$, respectively. Similar peak sizes, locations, and fading behavior are observed in the LSV diagram shown in FIG. 3A. Thus, it is likely that the primary source of current in the CV diagram is from spurious reactions between PGE and stainless steel, which are present in both the anode and top electrode. Such a conclusion also implies that little chemical interaction occurs between the Bi-nanostructures in the anode and the Mg$^{2+}$ ions in the electrolyte.

The presence of stainless steel powder, which was added to the BiNT powder to increase electrical conductivity, does not lead to reaction current values that are significantly higher than those observed from LSV data of a PGE in contact with SS foil. This observation suggests that the high reaction current observed in the WS$_2$ cathode was not caused by the addition of stainless steel powder, despite similar SS powder concentrations being present in both the BiNT anode and the WS$_2$ cathode.

Figure 6A:
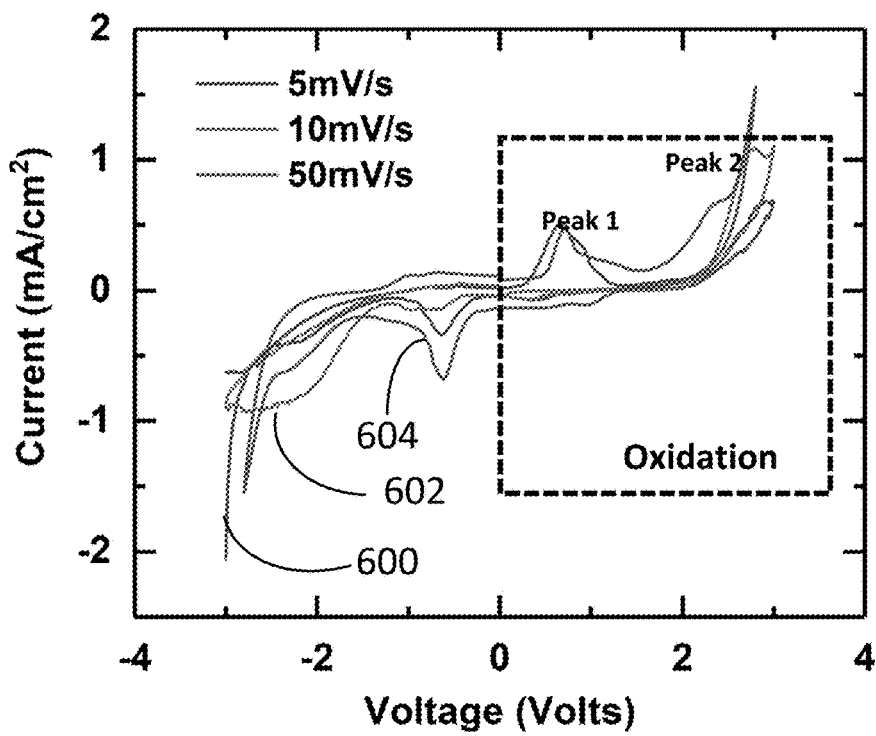
FIGS. 6A and 6B show CV plots of tungsten disulfide ($WS_2$) cathode-electrolyte interface for sweep rates of 5 mV/s, 10 mV/s, and 50 mV/s.
Figure 6B:
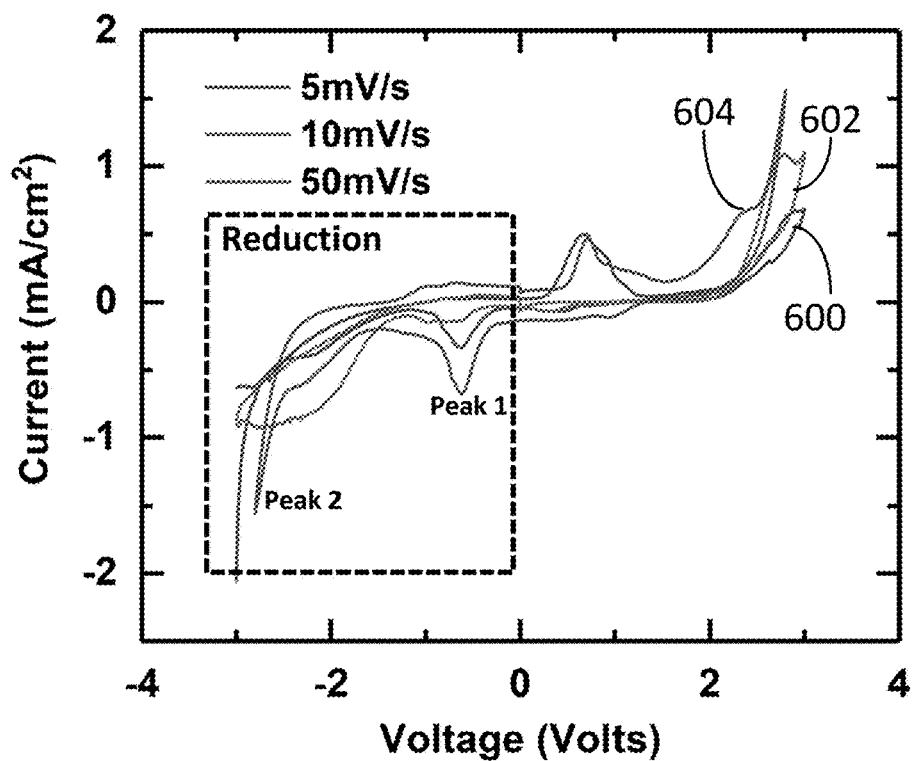

FIGS. 6A and 6B show CV plots of tungsten disulfide (WS$_2$) cathode-electrolyte interface for sweep rates of 5 mV/s (plot 600), 10 mV/s (plot 602), and 50 mV/s (plot 604). In FIG. 6A, at a sweep rate of 50 mV/s, peaks are seen at about 0.75V, about 2.3 C, and about 2.8V. The larger peaks shift inward at higher scan speed. Intercalation or conversion reactions are possible. In FIG. 6B, peaks at about 0.70V, about −2.3V, and about −2.8V show similar reaction current magnitudes and opposite signs at a scan rate of 50 mV/s. The larger peaks shift inward as scan speed is decreased. Higher scan rates show greater symmetry.

Figure 7:
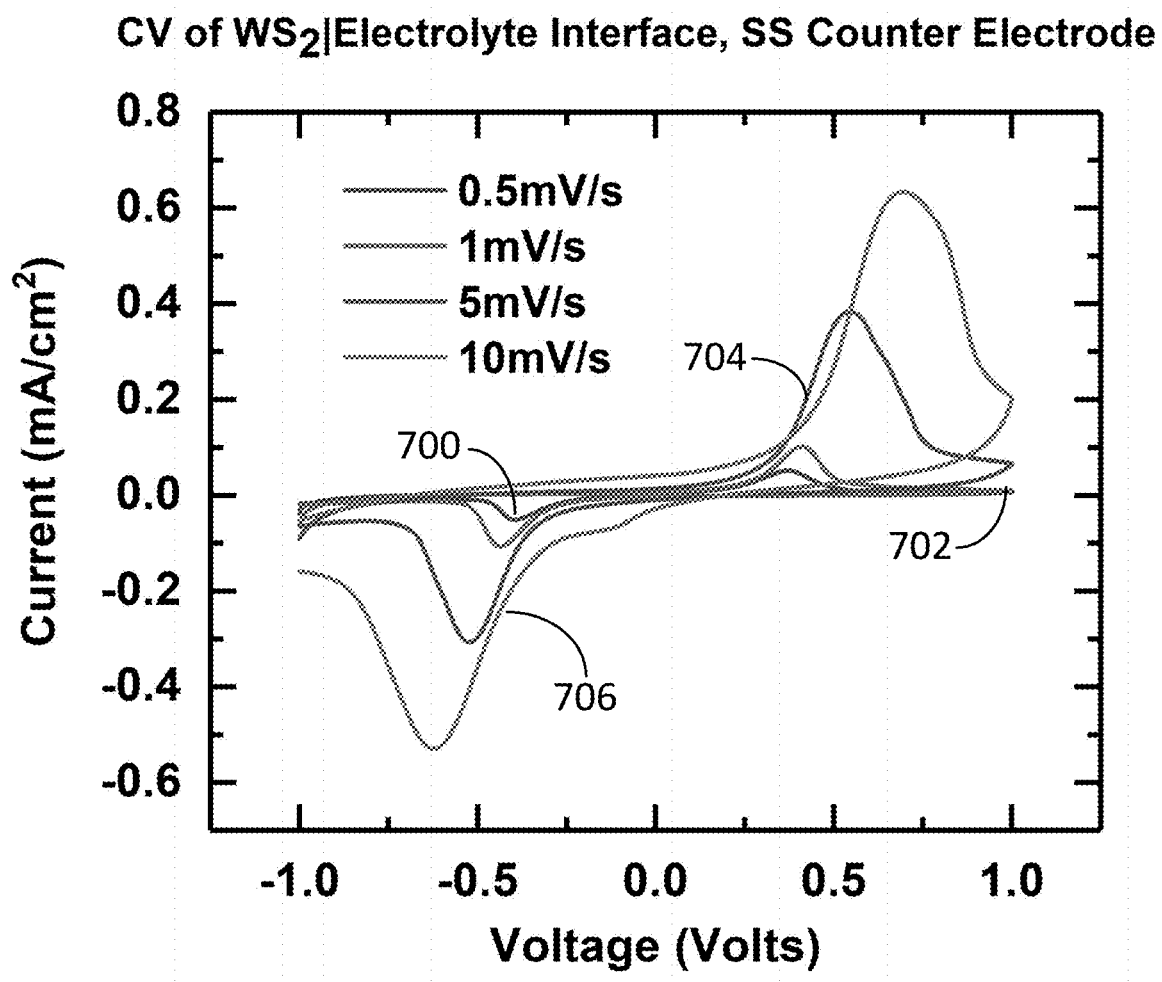
FIG. 7 shows a CV plot of a tungsten disulfide ($WS_2$) cathode-electrolyte interface at sweep rates of 0.5 mV/s, 1 mV/s, 5 mV/s, and 10 mV/s.
Figure 8A:
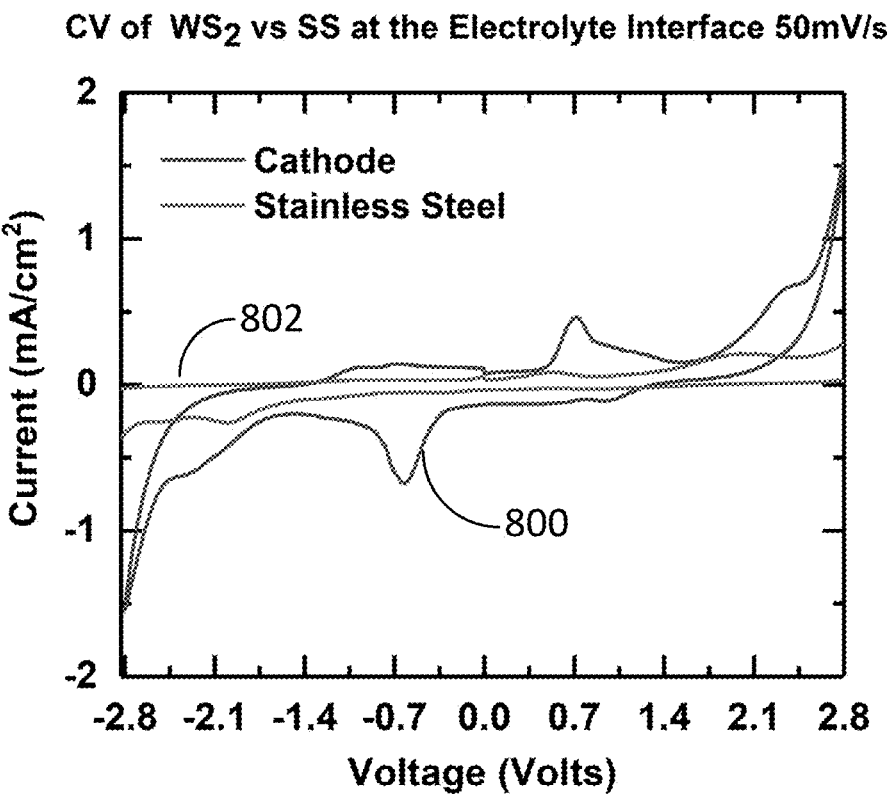
FIGS. 8A-8D show CV plots of tungsten disulfide ($WS_2$) cathode-electrolyte interface at sweep rates of 50 mV/s, 10 mV/s, 5 mV/s, and 0.5 mV/s, respectively.
Figure 8B:
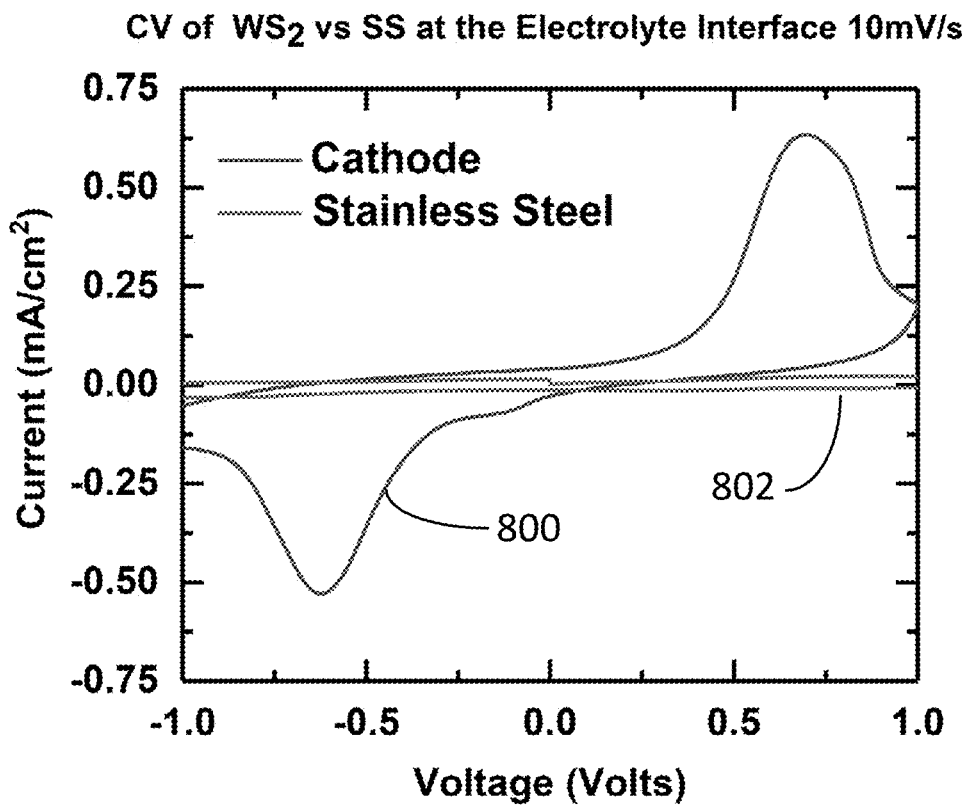
Figure 8C:
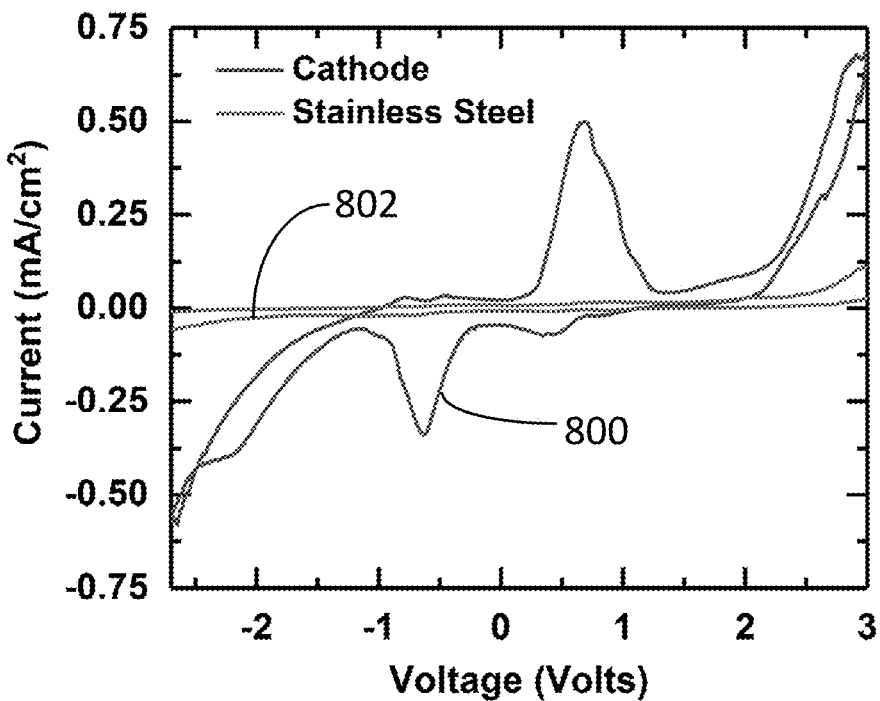
Figure 8D:
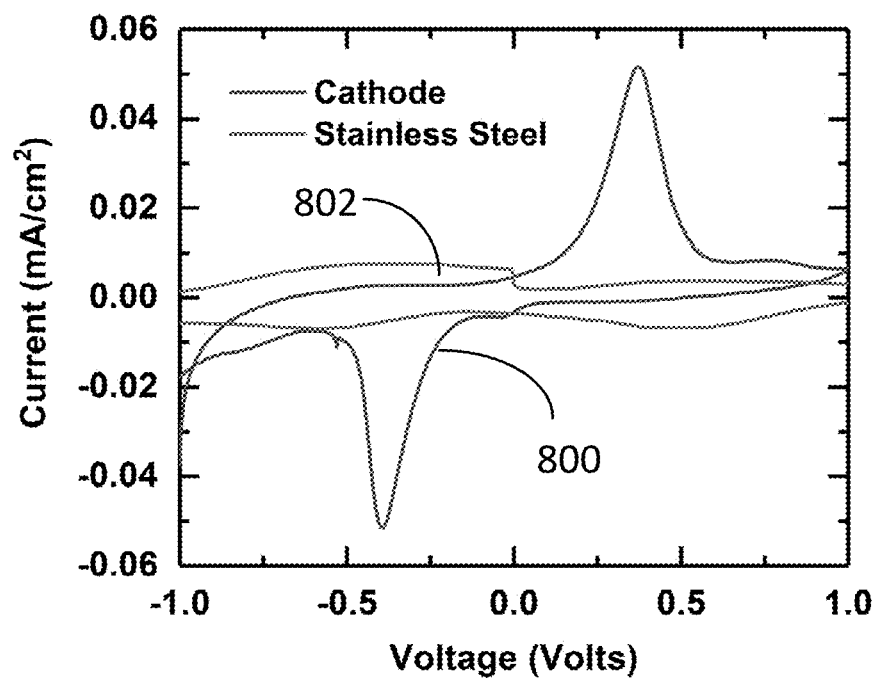

FIG. 7 shows a CV plot of a tungsten disulfide (WS$_2$) cathode-electrolyte interface at sweep rates of 0.5 mV/s (plot 700), 1 mV/s (plot 702), 5 mV/s (plot 704), and 10 mV/s (plot 706). Cycling around small peaks reveals a high degree of peak symmetry, even at low scan speeds. Peaks shift outward as scan rate increases. Maximum peak current is linearly proportional to the square root of the scan rate with a constant of about 0.24. Reversible intercalation reactions with Mg$^{2+}$ are possible.

FIGS. 8A-8D show CV comparison of a tungsten disulfide working electrode (plot 800) with a stainless steel working electrode (plot 802) at scan rates of 50 mV/s, 10 mV/s, 5 mV/s, and 0.5 mV/sec, respectively. The reaction current from the stainless steel and the electrolyte is a minor contributor to the overall reaction current.

Figure 9A:
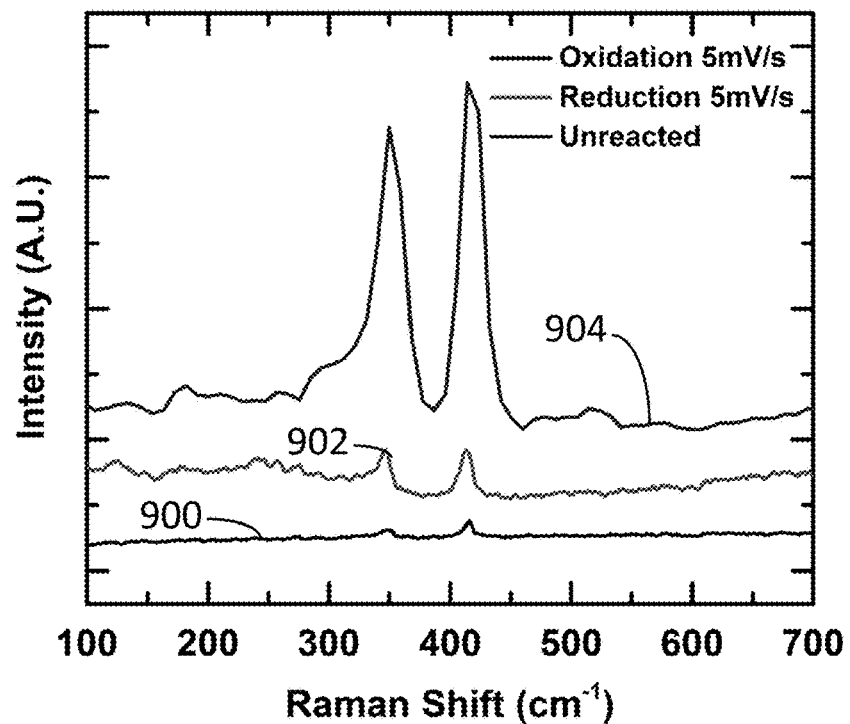
FIGS. 9A and 9B show Raman spectra of tungsten disulfide ($WS_2$) cathodes.
Figure 9B:
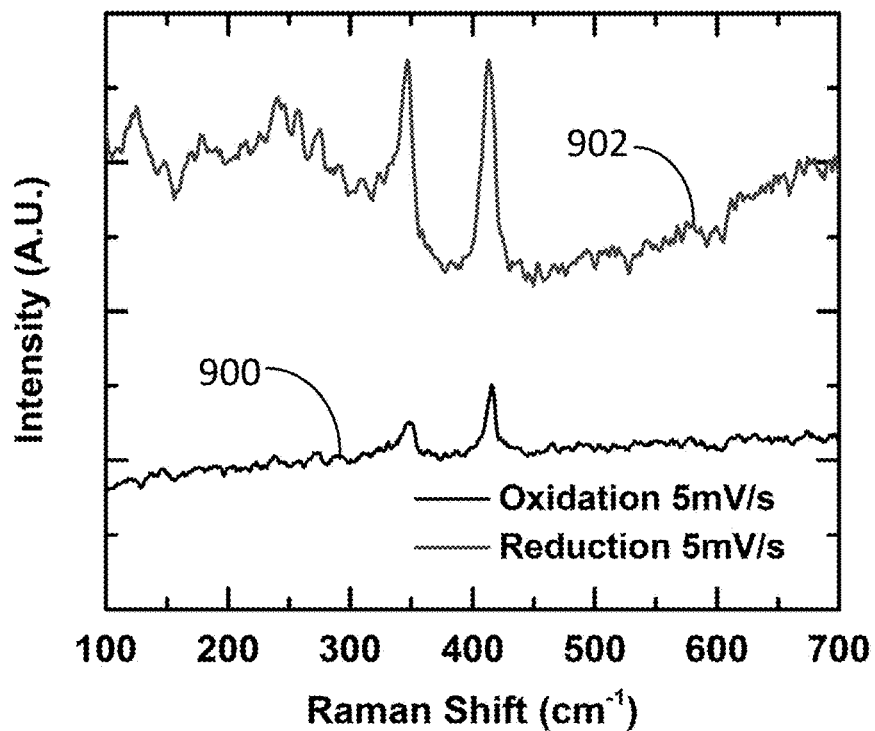

FIGS. 9A and 9B show Raman spectra of cycled tungsten disulfide cathodes. FIG. 9A shows oxidation at a scan rate of 5 mV/s (plot 900), reduction at a scan rate of 5 mV/s (plot 902), and unreacted (plot 904). FIG. 9B shows an enlargement of a portion of plots 900 and 902 in FIG. 9A. The spectra show two vibration modes $E^1_{2g}$ and $A_{1g}$ at 350 cm$^{-1}$ and 420 cm$^{-1}$, respectively. $A_{1g}$ moves +3 cm$^{-1}$ after the oxidation portion of the CV scan. $E^1_{2g}$ moves +1 cm$^{-1}$ after the oxidation part of the CV scan. The intensity falls off after the oxidation part of the CV scan. Peaks return to their initial positions after the reduction part of the CV scan is complete. Some intensity returns vs. pristine tungsten disulfide.

Only a few implementations are described and illustrated. Variations, enhancements and improvements of the described implementations and other implementations can be made based on what is described and illustrated in this document.

What is claimed is:
1. A magnesium-ion battery comprising:
 a solid, mechanically flexible polymer-based anode, wherein the polymer-based anode comprises bismuth nanostructure powder and an electrolyte binder, and the electrolyte binder comprises polyvinylidene fluoride-co-hexafluoropropylene, magnesium perchlorate, ethylene carbonate, and propylene carbonate;

a solid, mechanically flexible polymer-based cathode; and a polymer gel electrolyte in contact with the anode and the cathode.

2. The magnesium-ion battery of claim 1, wherein the bismuth nanostructure powder comprises bismuth nanotubes.

3. The magnesium-ion battery of claim 1, wherein the electrolyte binder further comprises fumed silica.

4. The magnesium-ion battery of claim 1, wherein the polymer-based anode further comprises stainless steel powder.

5. The magnesium-ion battery of claim 1, wherein the polymer-based cathode comprises tungsten disulfide and an electrolyte binder.

6. The magnesium-ion battery of claim 5, wherein the polymer-based cathode further comprises stainless steel powder.

7. The magnesium-ion battery of claim 1, wherein the polymer gel electrolyte comprises polyvinylidene fluoride-co-hexafluoropropylene and magnesium perchlorate.

8. The magnesium-ion battery of claim 7, wherein the polymer gel electrolyte further comprises ethylene carbonate and propylene carbonate.

9. The magnesium-ion battery of claim 7, wherein the polymer gel electrolyte further comprises fumed silica.

10. An electrode comprising:
bismuth nanostructure powder;
stainless steel powder; and
an electrolyte binder,
wherein the electrolyte binder comprises polyvinylidene fluoride-co-hexafluoropropylene and magnesium perchlorate.

11. The electrode of claim 10, wherein the bismuth nanostructure powder comprises bismuth nanotubes.

12. An electrode comprising:
tungsten disulfide; and
an electrolyte binder.

13. The electrode of claim 12, wherein the electrolyte binder comprises polyvinylidene fluoride-co-hexafluoropropylene and magnesium perchlorate.

14. The electrode of claim 13, wherein the electrolyte binder further comprises ethylene carbonate and propylene carbonate.

15. The electrode of claim 12, wherein the electrode further comprises stainless steel powder.

16. A magnesium-ion battery comprising:
a solid, mechanically flexible polymer-based anode, wherein the polymer-based anode comprises bismuth nanostructure powder and an electrolyte binder, and the electrolyte binder comprises polyvinylidene fluoride-co-hexafluoropropylene, magnesium perchlorate, and fumed silica;
a solid, mechanically flexible polymer-based cathode; and
a polymer gel electrolyte in contact with the anode and the cathode.

17. A magnesium-ion battery comprising:
a solid, mechanically flexible polymer-based anode, wherein the polymer-based anode comprises bismuth nanostructure powder, an electrolyte binder, and stainless steel powder;
a solid, mechanically flexible polymer-based cathode; and
a polymer gel electrolyte in contact with the anode and the cathode.

18. A magnesium-ion battery comprising:
a solid, mechanically flexible polymer-based anode;
a solid, mechanically flexible polymer-based cathode, wherein the polymer-based cathode comprises tungsten disulfide and an electrolyte binder; and
a polymer gel electrolyte in contact with the anode and the cathode.

19. The magnesium-ion battery of claim 18, wherein the polymer-based cathode further comprises stainless steel powder.

* * * * *